United States Patent
Iwasaki et al.

[11] Patent Number: 5,818,684
[45] Date of Patent: Oct. 6, 1998

[54] SHIELD TYPE MAGNETORESISTIVE HEAD ARRANGED FOR WEAKENING OF A GALVANO-CURRENT MAGNETIC FIELD

[75] Inventors: Hitoshi Iwasaki, Yokosuka; Yuzo Kamiguchi, Yokohama; Tomomi Funayama, Fujisawa, all of Japan

[73] Assignee: Kabushiki Kaisha Toshiba, Kawasaki, Japan

[21] Appl. No.: 712,119

[22] Filed: Sep. 11, 1996

[30] Foreign Application Priority Data

Sep. 13, 1995 [JP] Japan ................................ 7-235243

[51] Int. Cl.$^6$ ........................................ G11B 5/39
[52] U.S. Cl. ................................................. 360/113
[58] Field of Search .................... 360/113, 125, 360/126

[56] References Cited

U.S. PATENT DOCUMENTS

| | | | |
|---|---|---|---|
| 5,438,470 | 8/1995 | Ravipati et al. ................. | 360/113 |
| 5,563,752 | 10/1996 | Komuro et al. .................... | 360/113 |
| 5,576,914 | 11/1996 | Rottmayer et al. ................. | 360/113 |
| 5,585,199 | 12/1996 | Kamiguchi et al. ................ | 428/621 |
| 5,608,593 | 3/1997 | Kim et al. ........................ | 360/113 |

*Primary Examiner*—Jefferson Evans
*Attorney, Agent, or Firm*—Finnegan, Henderson, Farabow, Garrett & Dunner, L.L.P.

[57] ABSTRACT

A shield type magnetoresistive head has a GMR element exhibiting a giant magentoresistance effect phenomenon due to a spin dependent scattering, and an electrode, the GMR element comprising upper and lower shield films, upper and lower gap insulation films, a magnetic field detecting layer in which a magnetization rotates by a signal magnetic field, a non-magnetic layer, a magnetization fixed layer in which the magnetization is substantially not moved by the signal magnetic field, and a bias film contacting to the magnetization fixed layer, wherein a distance from a film-thicknesswise center of the magnetic field detecting layer to a surface of the shield film contacting to the gap film including the magnetization fixed layer is set to be greater compared with that on a side of not including the magnetization fixed layer.

8 Claims, 5 Drawing Sheets

SHIELD TYPE MAGNETORESISTIVE HEAD ARRANGED FOR WEAKENING OF A GALVANO-CURRENT MAGNETIC FIELD

BACKGROUND OF THE INVENTION

1. Field of the Invention

The present invention relates to a shield type magnetoresistive head which uses a spin valve type magnetoresistance effect film used for a hard disk drive, etc.

2. Description of the Related Art

In recent years, in the hard disk drive (HDD), etc., the necessity of the magnetic head which uses a sensitive giant magnetoresistance (GMR) effect element has been increased with the improvement of the recording density.

As shown in FIG. 5A, according to the GMR element comprising a magnetic layer 3 for detecting a signal magnetic field, a non-magnetic layer 4, a magnetization fixed layer 5 in which the magnetization is substantially not moved by the signal magnetic field, and an antiferromagnetic bias layer (not shown) for the magnetization fixing, the magnetization (Mp) direction of the magnetization fixed layer 5 is fixed to the direction of the medium magnetic field by the antiferromagnetic film bias, then the magnetization (Mf) of a magnetic field detecting layer is directed in the magnetization direction perpendicular thereto when the signal magnetic field is substantially 0, thereby realizing not only the giant resistance change but also the linear response with the satisfactory output waveform shown in the lower part of FIG. 5A. Similarly to the conventional MR head, the GMR element is constructed to be interposed between the magnetic shield films through the insulation layer, so that there is realized a sensitive reproducing head construction for the HDD, which is superior in reproducing resolution also.

However, if the large sense current is transmitted through the spin valve element e.g. in order to increase the sensitivity, the magnetic field caused due to the sense current is added thereto in the same direction as that of the signal magnetic field or in the reverse direction thereto as shown in FIG. 5B. As a result, the magnetization direction Mf of the magnetic layer 3 for detecting the signal magnetic field turns aside the direction perpendicular to the signal magnetic field. Accordingly, as shown in the lower part of FIG. 5B, the linear response with the satisfactory output waveform is not realized.

In order to obtain the highly sensitive reproducing output, it is required to have the large sense current. Therefore, the turbulence in the magnetization direction Mf due to the large sense current causes a problem.

SUMMARY OF THE INVENTION

The invention is made in order to treat with such a problem, therefore, it is an object of the invention to decrease the bad influence in which the magnetic field by the sense current exerts on the magnetic field detecting layer of the spin valve element.

A first aspect of the present invention is a shield type magnetoresistive head comprising a lower shield film, a lower gap film, a magnetoresistance effect element and an electrode, an upper gap film, and an upper shield film, which are formed in order in layers on a substrate, wherein the magnetoresistance effect element comprises a magnetic field detecting layer in which a magnetization rotates by a signal magnetic field, a magnetization fixed layer in which the magnetization is substantially not moved by the signal magnetic field, a non-magnetic layer disposed between the magnetic field detecting layer and the magnetization fixed layer, and a bias film contacting to the magnetization fixed layer, and a ratio of a distance $g_f$ and a distance $g_p$ is set so as to generate a magnetic field at the shield film on a side of the magnetic field detecting layer magnetized by a sense current, the magnetic field being enough to weaken a galvano-current magnetic field due to the sense current applied to the magnetic field detecting layer, the distance $g_f$ being from a film-thicknesswise center of the magnetic field detecting layer to a surface of the shield film contacting to the gap film not including the magnetization fixed layer, the $g_p$ being from the film-thicknesswise center of the magnetic field detecting layer to a surface of the shield film contacting to the gap film including the magnetization fixed layer.

Alternatively, the first aspect of the present invention is a shield type magnetoresistive head having a GMR element exhibiting a giant magentoresistance effect phenomenon due to a spin dependent scattering, and an electrode, upper and lower shield films, upper and lower gap insulation films disposed so as to contact to the upper and lower shield films, respectively, the GMR element comprising a magnetic field detecting layer in which a magnetization rotates by a signal magnetic field, a magnetization fixed layer in which the magnetization is substantially not moved by the signal magnetic field, a non-magnetic layer disposed between the magnetic field detecting layer and the magnetization fixed layer, and a bias film contacting to the magnetization fixed layer, characterized in that a distance $g_f$ is set so as to be less than a distance $g_p$, the distance $g_f$ being from a film-thicknesswise center of the magnetic field detecting layer to a surface of the shield film contacting to the gap film not including the magnetization fixed layer, the $g_p$ being from the film-thicknesswise center of the magnetic field detecting layer to a surface of the shield film contacting to the gap film including the magnetization fixed layer.

In the magnetoresistive head according to the present invention, a NiFe alloy film, a Co based amorphous film (CoZrNb alloy film, etc.), an FeAlSi alloy film, or a microcrystallite film containing a nitrogen or a carbon (FeTaN, FeZrC alloy film, etc.) which is 0.5 to 3 μm in thickness, is used for the upper and lower shield films, a magnetic alloy film made of CoFe, NiFe or NiFeCo, etc., which is 1 to 15 nm in thickness, is used for the magnetic field detecting layer. However, in a case where the Co based alloy is used, it is preferable to further use a magnetic under layer made of NiFe, NiFeX (X: at least one kind of components selected from the group comprised of Cr, V, Ti, Zr, Nb, Ta, Rh, Ir and Pd), or a Co based amorphous alloy, etc. It is preferable that Cu, Ag, Au or the alloy including them as the main component, which is 1 to 10 nm in thickness, is used for the non-magnetic layer, and a Co or Co based alloy layer of 1 to 10 nm in thickness is used for the magnetization fixed layer and the antiferromagnetic film made of FeMn, IrMn, NiMn, Ni(Co)O, etc., which is 2 to 50 nm in thickness, is used for the bias film. Further, the film made of alumina, aluminum nitride, silicon nitride, etc., which is 0.02 to 0.15 μm in thickness, is used for the upper and lower gap films.

Generally, the upper and lower gap lengths (distance being from a film-thicknesswise center of the magnetic field detecting layer to a surface of the shield film contacting to the gap film) is determined according to a predetermined linear recording density. For example, it is preferable that the upper and lower gap lengths each is not more than 0.1 μm in order to reproduce the linear recording density of 150 kFCl.

On the other hand, according to the present invention, for example, in a case where the magnetic field detecting layer is laminated on the lower gap film on a side of the substrate, the lower gap length $g_f$ corresponding to the distance from a surface of the lower shield film contacting to the lower gap film, to the film-thicknesswise center of the magnetic field detecting layer is made less than 0.1 μm, and the upper gap length $g_p$ corresponding to the distance from a surface of the upper shield film contacting to the upper gap film, to the film-thicknesswise center of the magnetic field detecting layer is made about 0.1 μm.

It is preferable that the lower gap length $g_f$ is not greater than one-half of the upper gap length $g_p$ (in this example, 0.05 μm).

In the GMR element according to the present invention, the sense current is concentrated into the intermediate non-magnetic film which is markedly lower in resistance than the other layers. As a result, the galvano-magnetic fields added to the upper and lower films are opposed in direction to each other (the same direction as that of the medium magnetic field, or the reverse direction thereto) with the intermediate non-magnetic film as a center. The magnetization of the magnetic field detecting layer is aligned to the direction of the galvano-magnetic field, also the magnetization of the shield film is aligned thereto.

As a result, the magnetic field generated due to the magnetization of the shield films is added to the magnetic field detecting layer. The galvano-magnetic field which is identical in direction with the magnetic field detecting layer is added to the shield film on a side of the magnetic field detecting layer viewing from the intermediate non-magnetic layer, so that the magnetic field added to the magnetic field detecting layer from the shield film cancels the sense current. On the contrary, since the galvano-magnetic field is added to the shield film on a side of the magnetization fixed layer which is opposed to the magnetic field detecting layer, in the opposite direction to the magnetic field detecting layer, the magnetic field from the shield film on a side of the magnetization fixed layer is added to the magnetic field detecting layer in the same direction as that of the galvano-magnetic field.

In other words, the magnetic field from the shield film on a side of the magnetization fixed layer and the magnetic field from the shield on a side of the magnetic field detecting layer are opposed in direction to each other. If this shield film is near the magnetic field detecting layer, the magnetic field strength from the shield film is increased. Accordingly, if the gap length on a side of not including the magnetization fixed layer, that is, the gap length on a side of the magnetic field detecting layer viewing from the intermediate non-magnetic layer is narrow, the galvano-magnetic field added to the magnetic field detecting layer and the magnetic field from the shield film are canceled with each other.

In a case where the shield film exists only on the side of the magnetic field detecting layer, that is, in a case where the ratio of the gap length on the side of not including the magnetization fixed layer to the gap length on the side of including the magnetization fixed layer is 0, the influence of the galvano-magnetic field to the magnetic field detecting layer is perfectly canceled. Particularly, when the ratio is not greater than one-half, the canceling effect is increased.

Therefore, there can be prevented the problem that the magnetization direction of the magnetic field detecting layer due to the sense current is disturbed, so that a superior linear response is realized, in addition to the high sensitivity due to the spin valve GMR.

A second aspect of the present invention is a shield type magnetoresistive head comprising a lower shield film, a lower gap film, a magnetoresistance effect element and an electrode, an upper gap film, and an upper shield film, which are formed in order in layers on a substrate, wherein the magnetoresistance effect element comprises a magnetic field detecting layer in which a magnetization rotates by a signal magnetic field, a magnetization fixed layer in which the magnetization is substantially not moved by the signal magnetic field, a non-magnetic layer disposed between the magnetic field detecting layer and the magnetization fixed layer, and a bias film contacting to the magnetization fixed layer, and a ratio of a permeability of the upper shield film and a permeability of the lower shield film is set so as to generate a magnetic field at the shield film on a side of the magnetic field detecting layer magnetized by a sense current, the magnetic field being enough to weaken a galvano-magnetic field due to the sense current applied to the magnetic field detecting layer.

In the second magnetoresistive head according to the present invention, the bad influence due to the galvano-magnet field added to the magnetic field detecting layer is suppressed by changing the permeabilities of the both shield films also. In other words, if the permeability of the shield film on the side of the magnetic field detecting layer is set to be greater than that of the shield film on the side of the magnetization fixed layer, the magnetization of the shield film on the side of the magnetic field detecting layer is changed easily compared with that of the shield film on the side of the magnetization fixed layer due to the galvano-magnetic shield. As a result, the magnetic field generated from the shield film on the side of the magnetic field detecting layer is added strongly to the magnetic field detecting layer compared with that of the shield film on the side of the magnetization fixed layer, then the galvano-magnetic field added to the magnetic field detecting layer can be canceled or suppressed.

In order to change the permeability of the shield film, the magnetic film having a small magnetic anisotropy is used for the shield film on the side of the magnetic field detecting layer, and the magnetic film having a large magnetic anisotropy is used for the shield film on the side of the magnetization fixed layer (Generally, the permeability is increased in reverse proportion to the anisotropic magnetic field). In a case where the Co based amorphous film is used for the upper and lower shield films, the magnetic anisotropy is increased if the concentration of the non-magnetic additional element (Zr, Nb, etc.) is decreased. Accordingly, by increasing the concentration of the non-magnetic additional element in the shield film on the side of the magnetic field detecting layer, and by decreasing the concentration of the non-magnetic additional element in the shield film on the side of the magnetization fixed layer, the above requirement can be satisfied. Otherwise, the material of a weak magnetic anisotropy such as Sendust, NiFe, etc., may be used for the shield film on the side of the magnetic field detecting layer, and the Co based amorphous film of a strong magnetic anisotropy may be used for the shield film on the side of the magnetization fixed layer.

These and other objects, features and advantages of the present invention will become more apparent in light of the following detailed description of best mode embodiments thereof, as illustrated in the accompanying drawings.

DESCRIPTION OF THE PREFERRED EMBODIMENTS

Embodiments of the present invention will be described hereinafter with reference to the drawings.

First embodiment

Figure 1:
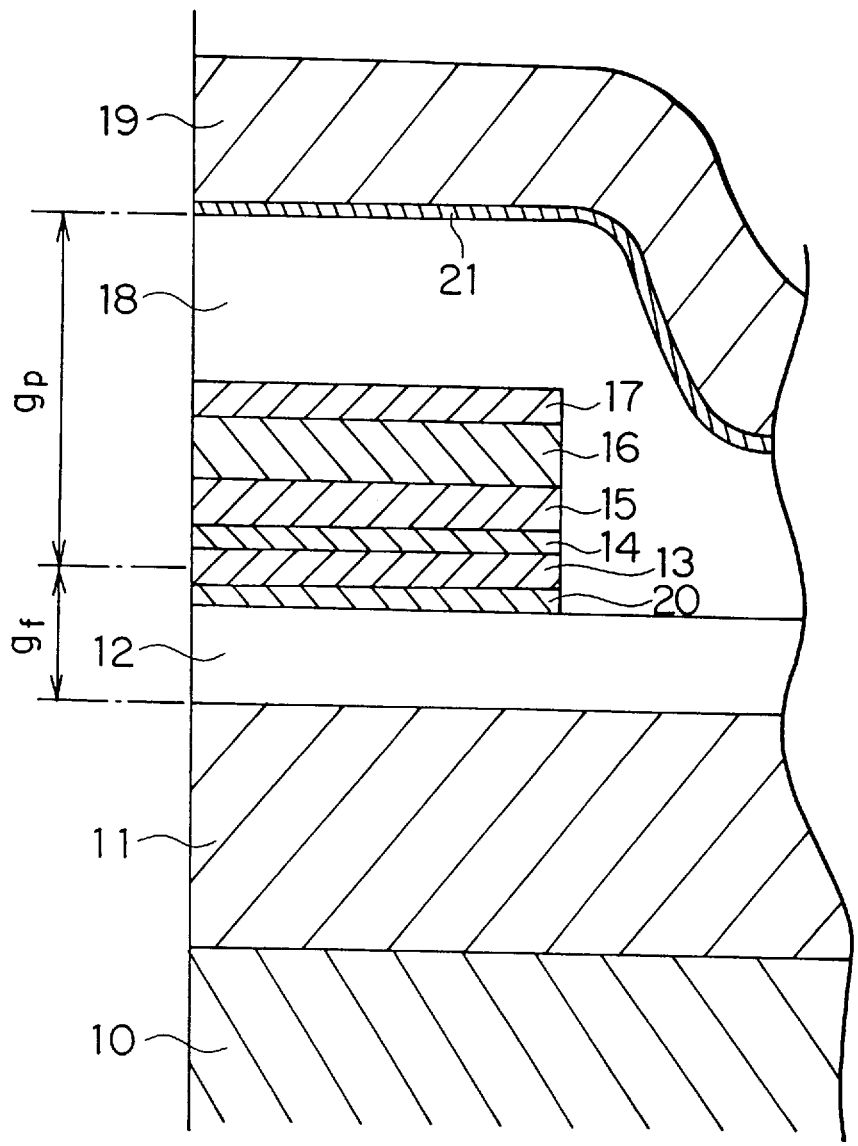
FIG. 1 is a schematic sectional view of a magnetoresistive head according to one embodiment of the present invention.

FIG. 1 is a sectional view showing a structure of a magnetoresistive head (MR head) according to a first embodiment of the present invention. In the drawing, the x-direction denotes a direction in which the medium signal magnetic field at a center of the recording track is added, and the y-direction denotes a direction in which the medium advances (thicknesswise direction of the respective films).

A lower shield film 11 comprised of a Co based amorphous film of 1.5 μm in thickness is formed on a substrate 10 comprised of the mixture of alumina and titanium carbide by sputtering.

Next, amorphous silicon of 5 nm in thickness, silicon oxide of 5 nm in thickness, and alumina of 20 nm in thickness are laminated thereon in order to form a lower gap film 12.

Further, a magnetic field detecting layer 13 is formed thereon through a titanium under layer 20 of 5 nm in thickness. This magnetic field detecting layer 13 is comprised of a laminated layer made of a NiFeCrNb alloy film of 4 nm in thickness and a CoFe alloy layer of 4 nm in thickness.

Further, an intermediate non-magnetic layer 14 made of Cu of 3 nm in thickness, a magnetization fixed layer 15 made of a CoFe alloy layer of 3 nm in thickness, an antiferromagnetic bias film 16 made of an IrMn alloy of 10 nm in thickness, and a protective film 17 made of titanium of 10 nm in thickness are formed in order, further a spin valve element is formed by the fine pattern processing.

Also, if necessary, the magnetization of the magnetic field detecting layer is stabilized in a direction perpendicular to the medium magnetic field by arranging a pair of hard films, etc., on two edges of the magnetic field detecting layer except a magnetic field sensing portion, etc.

Furthermore, Ta/Cu/Ta electrode pattern (not shown in this drawing) of 0.1 μm in total thickness, an upper gap layer 18 of 60 nm in thickness having the same structure as that of the lower gap layer 12, and an upper shield film 19 having the same structure as that of the lower shield film 11 are formed in order through a titanium under layer 21 of 5 nm in thickness.

In this embodiment, the lower gap length $g_f$ is 39 nm, and the upper gap length $g_p$ on the side of including the magnetization fixed layer is 95 nm. In other words, the gap length on the side of not including the magnetization fixed layer, characterizing the present invention, has a thickness not greater than one-half of the gap length on the side of including the magnetization fixed layer.

Figure 2:
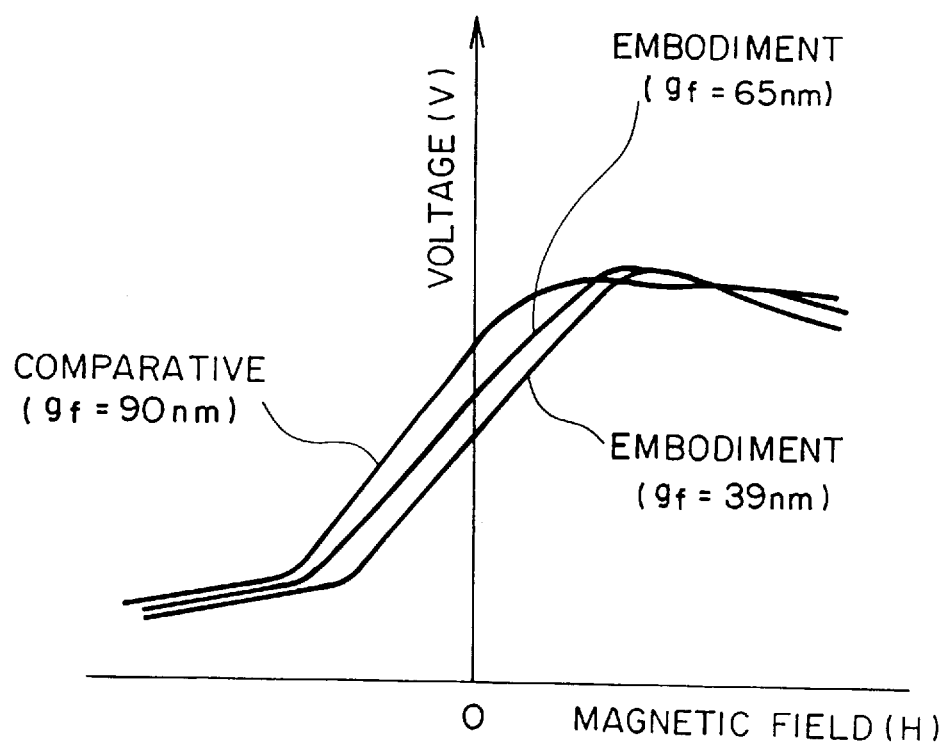
FIG. 2 is a graph showing a voltage-static magnetic field characteristics of the magnetoresistive head shown in FIG. 1.

The static magnetic field characteristics for a magnetic head of FIG. 1 in which a width of the spin valve film is 1 μm is shown in FIG. 2. For the comparison, there is also shown the case in which the lower gap length is 90 nm (sense current: 10 mA, height: 1 μm).

Moreover, there is also shown the result of the embodiment in which the $g_f$ in the magnetic head of FIG. 1 is 65 nm ($g_f/g_p$=0.68). Furthermore, for the comparison, there is also shown the case where the $g_f$ substantially equals to the $g_p$ (sense current: 10 mA, height: 1 μm).

In the comparison example, the operation point is positioned at an end of the linear response, the strain is apt to be generated at one signal magnetic field (plus side in the drawing).

On the other hand, in the present invention, the operation point is shifted on a substantially center side of the linear response range in $g_f/g_p$=0.68 and $g_f$=65 nm, so that linearity improvement effect can be obtained to the large signal magnetic field.

Further, the operation point is positioned at a substantially center of the linear response range in $g_f/g_p$ 0.41<0.5 and $g_f$=39 nm, thereby it is understood that the effect of the present invention is remarkable. As described above, the satisfactory signal of reducing the asymmetry of the waveform in the head can be obtained.

A second embodiment

Figure 3:
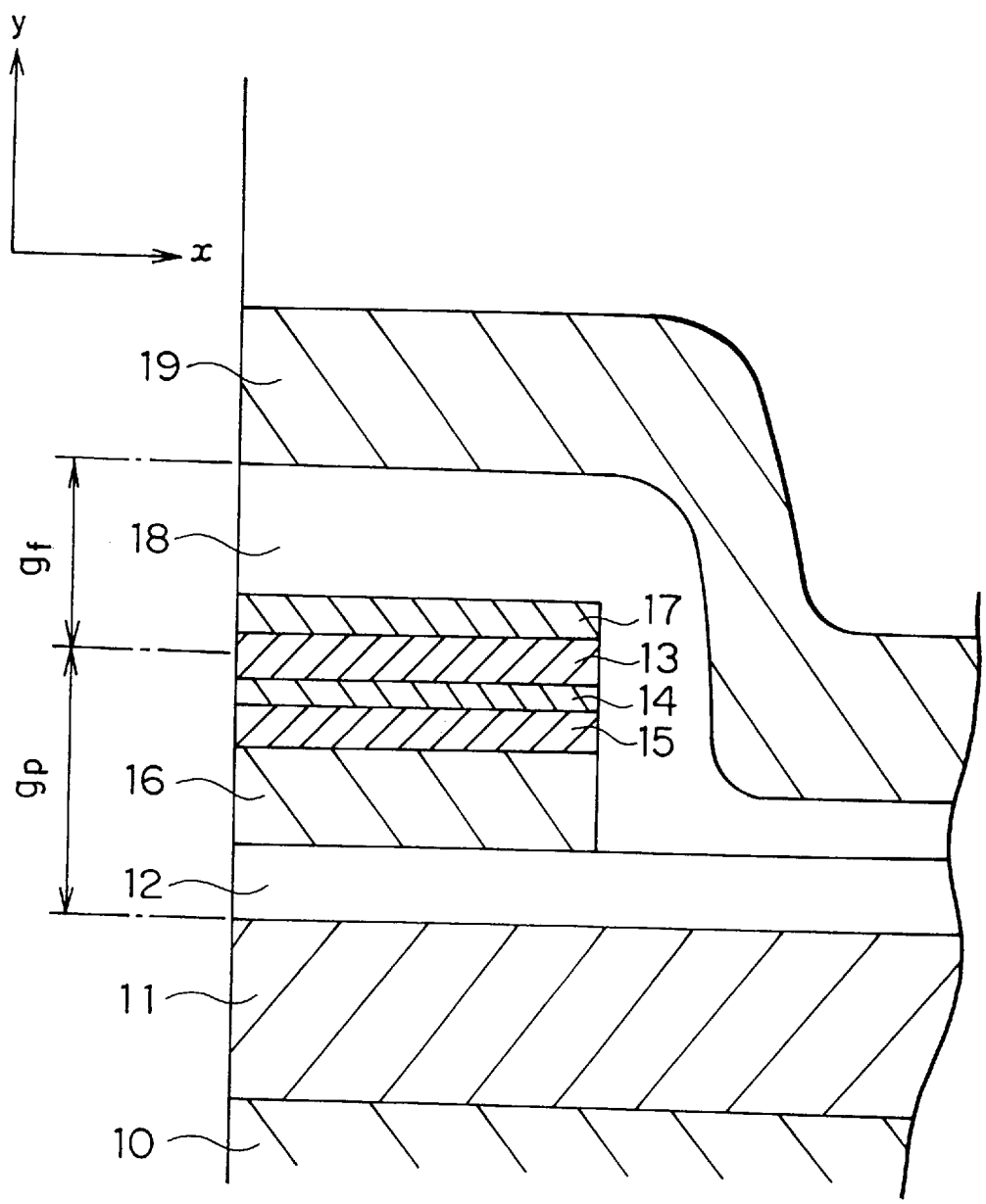
FIG. 3 is a schematic sectional view of a magnetoresistive head according to another embodiment of the present invention.

Another embodiment will be shown in FIG. 3. This is different from the first embodiment in the lamination order of the films of the spin valve elements, so that a lower shield film 11 of 1.5 μm in thickness, a lower gap film 12 of 30 nm in thickness, thereon an antiferromagnetic bias film 16 made of NiO of 50 nm in thickness a magnetization fixed layer 15 of a laminated layer structure comprised of a NiFe film of 2 nm in thickness and a Co film of 3 nm in thickness, a Cu intermediate non-magnetic film 14 of 3 nm in thickness, and a magnetic field detecting layer 13 of a laminated layer structure comprised of a CoFe film of 3 nm in thickness and a CoZrNb amorphous film of 5 nm in thickness are laminated in order.

Further, a titanium protecting film 17 of 5 nm in thickness, an upper gap film 18 of 30 nm in thickness, and an upper shield film 19 of 1.5 μm in thickness are formed thereon.

In this embodiment, the gap length $g_p$ on a side of including the magnetization fixed layer is 92 nm, the gap length $g_f$ on the opposed side is 39 nm. Similarly to the case of the first embodiment, the galvano-magnetic field added to the magnetic field detecting layer can be weaken.

A third embodiment

Figure 4:
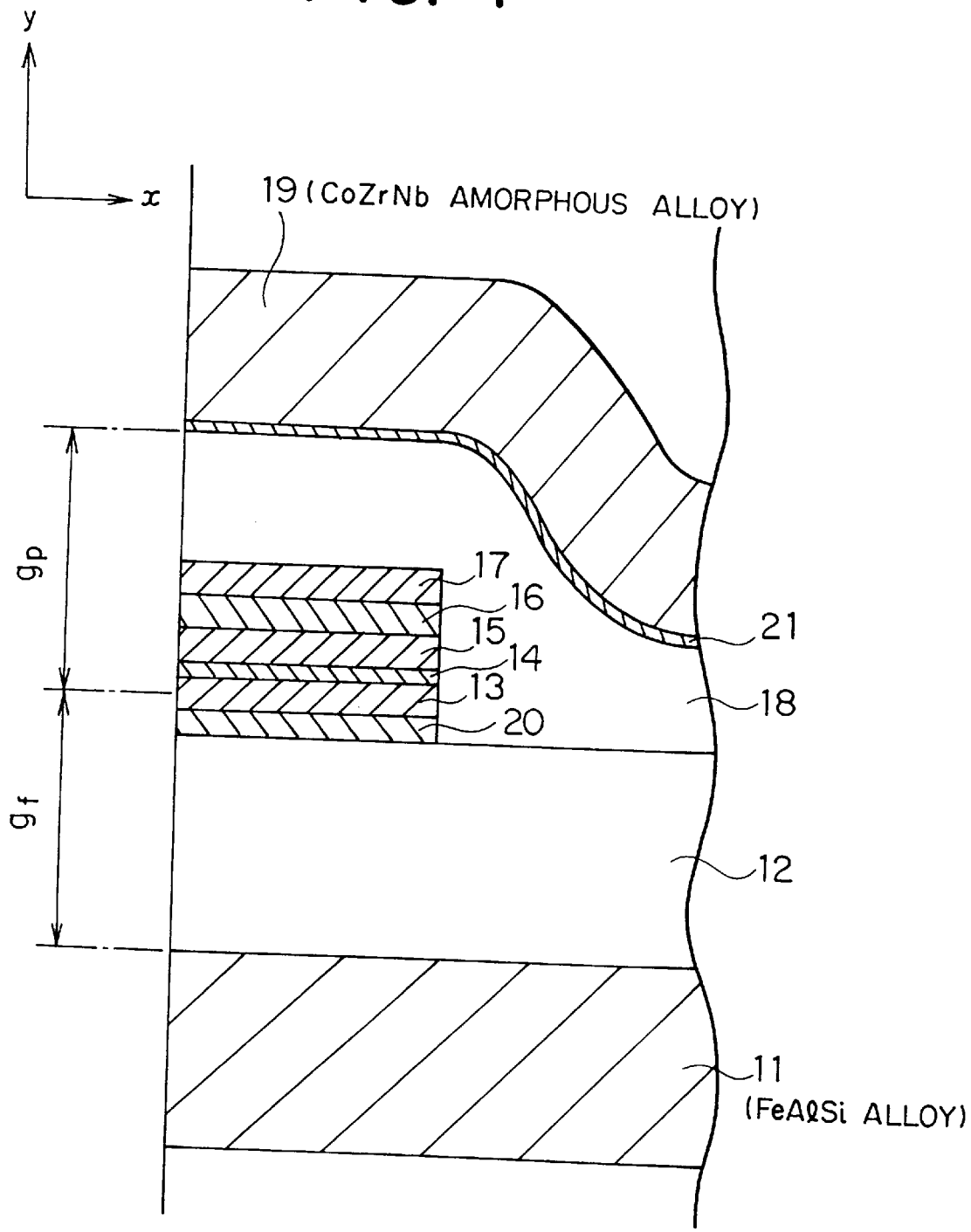
FIG. 4 is a schematic sectional view of a magnetoresistive head according to still another embodiment of the present invention.
Figure 5A:
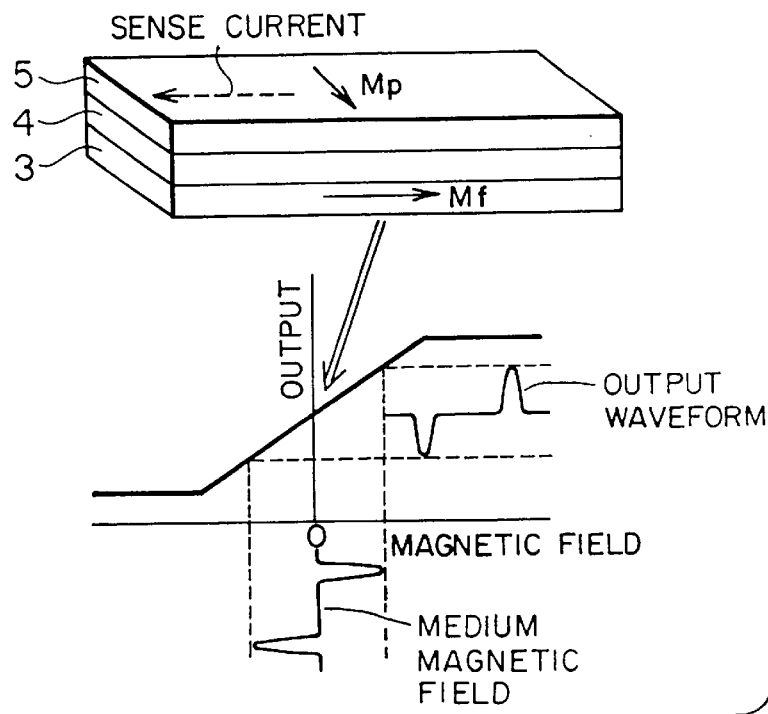
FIG. 5A and FIG. 5B are views showing a construction of the GMR element and the operation condition thereof.
Figure 5B:
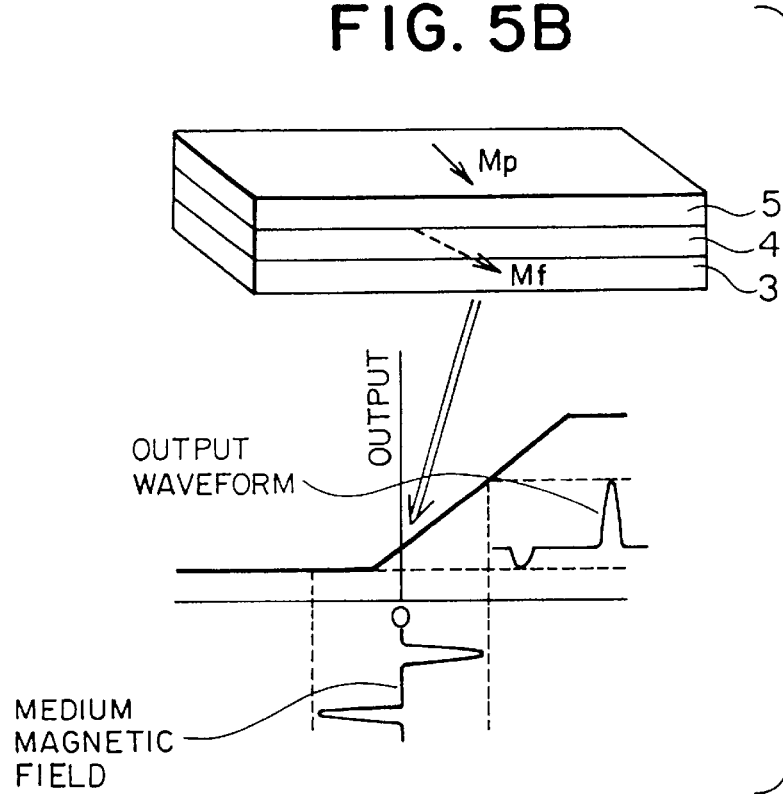

Still another embodiment will be shown in FIG. 4. The third embodiment is the same as the first embodiment except that $g_f$=80 nm, $g_p$=95 nm, and the lower shield film 11 is a Sendust (FeAlSi) alloy film, and the upper shield film 19 is a $CoZr_5Nb_8$ amorphous alloy film.

The FeAlSi alloy film 11 is formed by sputtering, and a slight magnetic anisotropy (anisotropic magnetic field Hk=2 Oe) is applied thereto in the track-widthwise direction by using the anisotropy of the forming particles in the incidence direction (in the direction perpendicular to the sheet in the drawing in FIG. 4). On the other hand, the anisotropy magnetic field Hk of 12 Oe is applied to the $CoZr_5Nb_8$ amorphous alloy film 19 in the track-widthwise direction by the heat treatment in the static magnetic field (magnetic direction: track-widthwise direction).

As a result, when the evaluation same as FIG. 2 is carried out, if the large electric current of 10 mA is applied thereinto, the operation point is positioned at a center of the linearity response region similarly to the case of $g_f$=39 nm in FIG. 2, the reproducing signal having the satisfactory good S/N ratio can be obtained without distorting the reproducing signal with respect to the large signal magnetic field.

As described above, according to the magnetoresistive head of the present invention, the sensitive reproducing signal having the satisfactory S/N ratio which is superior in the linearity response can be obtained.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A shield type magnetoresistive head comprising:
   a lower shield film, a lower gap film, a magnetoresistance effect element, an upper gap film, and an upper shield film, which are formed in order in layers on a substrate, said magnetoresistance effect element comprising:
   a magnetic field detecting layer in which a magnetization rotates by a signal magnetic field,
   a magnetization fixed layer in which the magnetization is substantially not moved by the signal magnetic field,
   a non-magnetic layer disposed between said magnetic field detecting layer and said magnetization fixed layer, and
   a bias film contacting to said magnetization fixed layer,
   wherein a ratio of a permeability of said upper shield film and a permeability of said lower shield film is set so as to generate a magnetic field at said shield film that is disposed on a side of said magnetic field detecting layer magnetized by a sense current, said magnetic field being enough to weaken a galvano-magnetic field due to said sense current added to said magnetic field detecting layer.

2. A shield type magnetoresistive head comprising:
   a first shield film, a first gap film, a magnetoresistance effect element, a second gap film, and a second shield film, which are formed in order in layers, said magnetoresistance effect element comprising:
   a magnetic field detecting layer in which a magnetization rotates by a signal magnetic field, said magnetic field detecting layer being disposed above said first gap film;
   a magnetization fixed layer in which the magnetization is substantially not moved by the signal magnetic field;
   a non-magnetic layer disposed between said magnetic field detecting layer and said magnetization fixed layer; and
   a bias film contacting to said magnetization fixed layer, said bias film being disposed below said second gap film,
   wherein a magnetic anisotropy of one of said first and second shield films, disposed on a side of said magnetization detecting layer, is set to be less than a magnetic anisotropy of another shield film, disposed on a side of said magnetization fixed layer so as to generate a magnetic field at said first shield film magnetized by a sense current, said magnetic field being enough to weaken a galvano-current magnetic field due to said sense current applied to said magnetic field detecting layer.

3. A shield type magnetoresistance head comprising:
   a lower shield film, a lower gap film, a magnetoresistance effect element, an upper gap film, and an upper shield film, formed in order in layers above a substrate, said magnetoresistance effect element comprising:
   a magnetic field detecting layer in which a magnetization rotates by a signal magnetic field, said magnetic field detecting layer being disposed on said lower gap film;
   a non-magnetic layer formed on said magnetic field detecting layer;
   a magnetization fixed layer in which the magnetization is substantially not moved by the signal magnetic field, said magnetization fixed layer being formed on said non-magnetic layer; and
   a bias film formed on said magnetization fixed layer;
   wherein a ratio of a distance $g_f$ and a distance $g_p$ is set so as to generate a magnetic field at said lower shield film magnetized by a sense current, said magnetic field being enough to weaken a galvano-current magnetic field due to said sense current applied to said magnetic field detecting layer,
   said distance $g_f$ being from a thicknesswise center of said magnetic field detecting layer to a surface of said lower shield film contacting to said lower gap film,
   said distance $g_p$ being from said thicknesswise center of said magnetic field detecting layer to a surface of said upper shield film contacting to said upper gap film.

4. A shield type magnetoresistive head according to claim 3, wherein said distance $g_f$ is less than said distance $g_p$.

5. A shield type magnetoresistive head as set forth in claim 4, wherein said distance $g_f$ is less than one-half of said distance $g_p$.

6. A shield type magnetoresistive head comprising:
   a lower shield film, a lower gap film, a magnetoresistance effect element, an upper gap film, and an upper shield film, which are formed in order in layers above a substrate, said magnetoresistance effect element comprising:
   a bias film disposed on said lower gap film;
   a magnetization fixed layer in which the magnetization is substantially not moved by the signal magnetic field, said magnetization fixed layer being formed on said bias film;
   a non-magnetic layer formed on said magnetization fixed layer;
   a magnetic field detecting layer being formed on said non-magnetic layer; and
   wherein a ratio of a distance $g_f$ and a distance $g_p$ is set so as to generate a magnetic field at said upper shield film magnetized by a sense current, said distance $g_f$ being less than 0.1 $\mu$m, said magnetic field being enough to weaken a galvano-current magnetic field due to said sense current applied to said magnetic field detecting layer,
   said distance $g_f$ being from a thicknesswise center of said magnetic field detecting layer to a surface of said upper shield film contacting to said upper gap film,
   said distance $g_p$ being from said thicknesswise center of said magnetic field detecting layer to a surface of said lower shield film contacting to said lower gap film.

7. A shield type magnetoresistive head according to claim 6, wherein said distance $g_f$ is less than said distance $g_p$.

8. A shield type magnetoresistive head according to claim 7, wherein said distance $g_f$ is less than one-half of said distance $g_p$.

* * * * *

UNITED STATES PATENT AND TRADEMARK OFFICE
CERTIFICATE OF CORRECTION

PATENT NO.: 5,818,684

DATED: October 6, 1998

INVENTOR(S): Iwasaki et al.

It is certified that an error appears in the above-identified patent and that said Letters Patent is hereby corrected as shown below:

Title page, Item [57], line 2 of the Abstract, "magentoresistance" should read --magnetoresistance--.

Signed and Sealed this

Nineteenth Day of October, 1999

*Attest:*

Q. TODD DICKINSON

*Attesting Officer*  *Acting Commissioner of Patents and Trademarks*